(12) United States Patent
Van Auken (10) Patent No.: US 6,486,645 B1
(45) Date of Patent: Nov. 26, 2002

(54) VOLTAGE REGULATION CIRCUIT AND RELATED METHODS HAVING A DYNAMICALLY DETERMINED MINIMUM DISCHARGE TIME

(75) Inventor: Jeffery B. Van Auken, Littleton, MA (US)

(73) Assignee: Sipex Corporation, Billerica, MA (US)

( * ) Notice: Subject to any disclaimer, the term of this patent is extended or adjusted under 35 U.S.C. 154(b) by 0 days.

(21) Appl. No.: 09/880,406

(22) Filed: Jun. 13, 2001

(51) Int. Cl.$^7$ ................................................. G05F 1/40
(52) U.S. Cl. ......................... 323/287; 323/285; 323/222
(58) Field of Search ................................. 323/283, 284, 323/287, 282, 285, 224

(56) References Cited

U.S. PATENT DOCUMENTS

| | | | | |
|---|---|---|---|---|
| 5,808,455 | A | * 9/1998 | Schwartz et al. | 323/271 |
| 5,949,226 | A | 9/1999 | Tanaka et al. | 323/285 |
| 5,994,885 | A | 11/1999 | Wilcox et al. | 323/285 |
| 6,100,675 | A | 8/2000 | Sudo | 323/282 |
| 6,157,182 | A | 12/2000 | Tanaka et al. | 323/284 |
| 6,215,288 | B1 | 4/2001 | Ramsey et al. | 323/224 |
| 6,246,220 | B1 | * 6/2001 | Isham et al. | 323/224 |

OTHER PUBLICATIONS

Linear Technology, "Micropower Step–Up DC/DC Converters in SOT–23", *Linear Technology Corporation*, 8 pages, (1998), No month.

Linear Technology, "Micropower Inverting DC/DC Converters in SOT–23", *Linear Technology Corporation*, 8 pages, (1999), No month.

Maxim, "High–Efficiency, Low Supply–Current, Compact, Step–Up DC–DC Converters", *Maxim Integrated Products*, 12 pages, (2000), No month.

Maxim, "1–Cell to 2–Cell, Low–Noise, High Efficiency, Step–Up DC–DC Converter", *Maxim Integrated Products*, 12 pages, (1998), No month.

Motorola, "Variable Frequency Micropower DC–to–DC Converter", *Motorola, Inc.*, 12 pages, (1996), No month.

Seiko, "PWM Control & PWM/PFM Control High–Frequency Step–Up Switching Regulator–Controllers", *Seiko Instruments, Inc.*, 41 pages, (2000), No month.

Seiko, "Small Package PFM Control Step–Up Switching Regulator", *Seiko Instruments, Inc.*, 38 pages, (2000), No month.

* cited by examiner

*Primary Examiner*—Shawn Riley
(74) *Attorney, Agent, or Firm*—Testa, Hurwitz & Thibeault, LLP (57) ABSTRACT

A circuit and method for providing a regulated output voltage. In one embodiment, the circuit includes a feedback comparator, a latch module, a switch, a current limit module and a pulse module. The pulse module generates an off-time signal that is substantially proportional to the reciprocal of the difference of the output voltage and a supply voltage. In another aspect, the method includes the step of comparing the output voltage and a reference voltage, and comparing an inductor current and a reference current. Additionally, the method includes the step of charging the inductor in response to the comparisons, and discharging the inductor for a minimum period of time if the inductor current increase to substantially equal the reference current.

23 Claims, 5 Drawing Sheets

VOLTAGE REGULATION CIRCUIT AND RELATED METHODS HAVING A DYNAMICALLY DETERMINED MINIMUM DISCHARGE TIME

FIELD OF THE INVENTION

The invention relates generally to a circuit that provides a regulated output voltage and more specifically to a circuit that uses a pulse frequency modulated technique to generate the regulated output voltage.

BACKGROUND OF THE INVENTION

Many electronic applications of today require the use of circuits capable of providing a stable output voltage over a range of input voltages. Devices such as cellular telephones and personal digital assistants typically receive their power from a supply battery. As the device operates, battery power is consumed and the battery voltage changes. Consequently, if the supply voltage is not regulated, the performance of the device can change over time.

The prior art teaches many ways to accomplish this conversion. For example, some portable electronic devices use arrays of capacitors (e.g., charge pumps) to convert the source voltage into a voltage with a different polarity and/or magnitude. Other devices use switching power supplies to provide a regulated voltage for proper operation. Switching losses inherent in such supplies can limit the power efficiency.

Typically, the regulation circuit is left on when the portable electronic device goes into a sleep mode. If the light load quiescent current of the regulator circuit is not controlled effectively, the life of the supply battery is significantly reduced, even when the device is in sleep mode.

SUMMARY OF THE INVENTION

The invention relates to a circuit and method for providing a regulated output voltage. The present invention increases the amount of output current delivered to a load and reduces the amount of quiescent current used by the regulation circuit when an electronic device is in sleep mode. The circuit provides increased output current transfer to the load by applying a voltage source to an inductor until a maximum allowable current through the inductor is realized. The supply voltage is then removed from the inductor and the current is transferred to the load for at least a minimum period. The minimum period is substantially proportional to the output voltage and the supply voltage.

One aspect of the invention relates to a voltage regulation circuit. The circuit includes a feedback comparator, a latch module, a switch, a current limit module and a pulse module. The feedback comparator includes a first input terminal configured to receive a regulated output voltage, a second input terminal configured to receive a first reference voltage, and an output terminal. The feedback comparator generates a comparison signal at its output terminal in response to the regulated output voltage. The latch module includes a first input terminal in communication with the feedback comparator output terminal, a second input terminal configured to receive an off-time signal having a variable asserted duration, and an output terminal. The latch module generates a charge signal in response to the comparison signal and the off-time signal. The switch includes a control terminal in communication with the latch output terminal, a first terminal configured to receive a current level signal, and a second terminal configured to receive a second reference voltage. The current limit module includes a first input terminal in communication with the latch output terminal, a second input terminal configured to receive the current-level signal, a third input terminal configured to receive the regulated output voltage, and a current limit output terminal. The current limit module generates a peak detect signal in response to the charge signal, the regulated output voltage and the current level signal. The pulse module includes a first input terminal in communication with the current limit module output terminal, a second input terminal configured to receive a supply voltage, a third input terminal configured to receive the regulated output voltage, and an output terminal in communication with the second latch input terminal. The pulse module generates the off-time signal in response to the peak detect signal, the supply voltage and the output voltage. In one embodiment, the variable asserted duration of the off-time signal is substantially proportional to the inverse of the difference between the regulated output voltage and the input voltage.

In one embodiment, the circuit includes a driver module having an input terminal in communication with the latch output terminal and an output terminal in communication with the first input terminal of the current limit module and the switch control terminal. In another embodiment, the current limit module includes a limit switch and a limit comparator. The limit switch includes a control terminal in communication with the third input terminal of the current limit module, a first terminal configured to receive a reference current, and a second input terminal configured to receive a third reference voltage. The limit comparator includes first input terminal in communication with the first terminal of the limit switch, a second input terminal in communication with the second terminal of the current limit module, a reset terminal in communication with the first of the current limit module and an output terminal in communication with the current limit output terminal.

In another aspect, the circuit includes a feedback comparator, a pulse generation module, and a logic module. The feedback comparator includes a first input terminal configured to receive a regulated output voltage, a second input terminal configured to receive a first reference voltage, and an output terminal. The feedback comparator generates a comparison signal at its output terminal in response to the regulated output voltage. The pulse generation module includes an output terminal and provides an off-time signal with a first state at its output terminal. The first state has a dynamically determined duration. The logic module includes a first logic terminal in communication with the feedback comparator output terminal, a second logic module terminal in communication with the pulse generation module output terminal, and a charge control terminal. The logic module provides a charge signal at the charge control terminal in response to the comparison signal and the off-time signal.

Another aspect of the invention relates a method for generating a regulated output voltage. The method includes the steps of comparing the regulated output voltage and a reference voltage, and comparing an inductor current and a reference current. Additionally, the method includes the steps of charging an inductor if the regulated output voltage is less than the reference voltage and if the inductor current is less the reference current, and discharging the inductor for at least a minimum time if the inductor current increases to substantially equal to the reference current. In one embodiment, the minimum time is responsive to a supply voltage and the regulated output voltage. In a further embodiment, the minimum time is substantially proportional to the reciprocal of the difference between the regulated output voltage and the supply voltage.

In another aspect, the method includes the step of generating an off-time signal having a first state of an asserted duration and a second state. The method also includes the steps of charging an inductor if the regulated output voltage is less than a reference voltage and the off-time signal is not in the first state, and interrupting the charging of the inductor for at least the asserted duration if the off-time signal transitions from the second state to the first state. In one embodiment, the asserted duration is dynamically configured in response to the regulated output voltage and a supply voltage. In a further embodiment, the asserted duration is substantially proportional to the reciprocal of the difference between the output voltage and the supply voltage.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1:
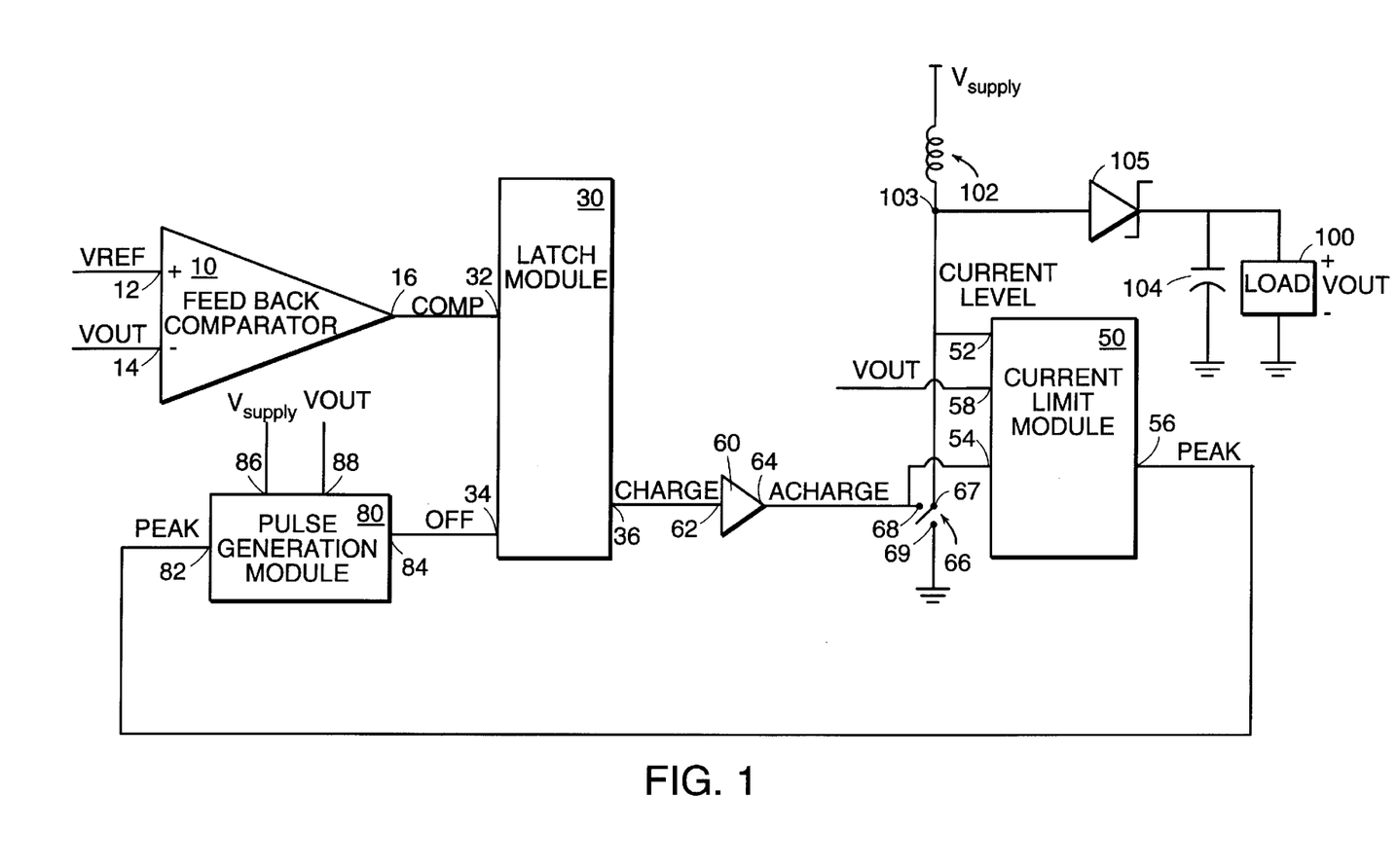
FIG. 1 is a block diagram of an embodiment of a regulated output voltage circuit in accordance with the present invention.

With reference to FIG. 1, in brief overview, one embodiment of the voltage regulation circuit constructed in accordance with the present invention includes a feedback comparator 10, a latch module 30, a current limit module 50, a driver module 60, a switch 66, and a pulse generation module 80. The feedback comparator 10 includes a feedback comparator output terminal 16, a first feedback comparator input terminal 12 configured to receive a first reference voltage VREF, and a second feedback comparator input terminal 14 configured to receive an output voltage VOUT generated across a load 100 and a load capacitance 104. The feedback comparator output terminal 16 is in communication with a first input terminal 32 of the latch module 30. Additionally, the latch module 30 includes an output terminal 36, and a second input terminal 34 configured to receive an off-time signal OFF.

The driver module 60 includes an input terminal 62 in communication with the output terminal 36 of latch module 30, and an output terminal 64. The switch 66 includes a control terminal 68 in communication with the output terminal 64 of the driver module 60, a first terminal 67 in communication with an inductor 102, and a second terminal 69 connected to ground. In one embodiment, switch 66 is a metal oxide semiconductor field effect transistor (MOSFET). The current limit module 50 includes a first input terminal 52 in communication with the inductor 102, a second input terminal 54 in communication with the output terminal 64 of the driver module 60, a third input terminal 58 configured to receive the output voltage VOUT, and an output terminal 56.

Pulse generation module 80 includes a first input terminal 82 in communication with the output terminal 56 of current limit module 50, a second input terminal 86 configured to receive the supply voltage VSUPPLY, a third input terminal 88 configured to receive the output voltage VOUT, and an output terminal 84 in communication with the second input terminal 34 of the latch module 30. In another embodiment, the voltage regulation circuit includes a voltage divider network (not shown) configured to provide a scaled representation of the output voltage VOUT at the second feedback comparator input terminal 14.

In one embodiment, input terminals 12 and 14 of feedback comparator 10 are in communication with VOUT and VREF, respectively. Consequently, latch module 30 is modified, for example, by adding an inverter, to accommodate the resulting change in the comparison signal COMP.

The following is a general overview of the signals referenced in FIG. 1, and four operating states of the present invention as summarized in Table 1. In operation, the feedback comparator 10 compares output voltage VOUT to the reference voltage VREF. In response, feedback comparator 10 generates a comparison signal COMP at output terminal 16 indicative of whether the reference voltage VREF exceeds the output voltage VOUT. In response to comparison signal COMP and the off-time signal OFF, latch module 30 generates a charge signal CHARGE which is received by driver module 60 at input terminal 62. Amplified charge signal ACHARGE provided at output terminal 64 is applied to the control terminal 68 of switch 66. Switch 66 controls the application of the supply voltage VSUPPLY across inductor 102 by connecting and disconnecting terminal 103 of inductor 102 to ground. Current limit module 50 receives the amplified charge signal ACHARGE, the output voltage VOUT, and a current level signal CURRENT LEVEL indicative of the magnitude of current flowing through inductor 102, and in response, generates a peak current level detection signal PEAK at output terminal 56. Pulse generation module 80 receives peak current level detection signal PEAK, supply voltage VSUPPLY, and output voltage VOUT and, in response, generates off-time signal OFF (i.e., a "one-shot" signal) at output terminal 84. The duration of off-time signal OFF is dependent on supply voltage VSUPPLY and output voltage VOUT. By dynamically controlling the duration of off-time signal OFF in response to variations in supply voltage VSUPPLY and output voltage VOUT, the power transfer from inductor 102 to load 100 is improved because the current ripple dependency on supply voltage VSUPPLY is eliminated. The application of supply voltage VSUPPLY to inductor 102 is described in more detail below.

TABLE 1

| | Logic Level | | | |
|---|---|---|---|---|
| COMP | Low | Low | High | High or Low |
| OFF | Low | Low | Low | High |
| CHARGE | Low | Low | High | Low |
| ACHARGE | Low | Low | High | Low |
| PEAK | Low | Low | Low | High to Low |
| Current in Inductor | No | Yes | Yes or No | Yes |

TABLE 1-continued

| | Logic Level | | | |
|---|---|---|---|---|
| RESULT | Wait for COMP to transition to begin charging | Discharge Inductor | Charge Inductor | Discharge Inductor for duration off-time signal |

In one mode of operation, the current through inductor 102 is nonzero at the beginning of a charge cycle. This mode of operation is referred to as continuous conduction mode (CCM) because there is an uninterrupted current flowing through inductor 102. A complementary operating mode, referred to as discontinuous conduction mode (DCM), is implemented if the current through inductor 102 decreases to substantially zero for a finite time during operation, such as during sleep mode. Typically, only a small average current is required to maintain output voltage VOUT in regulation during in DCM.

Figure 2:
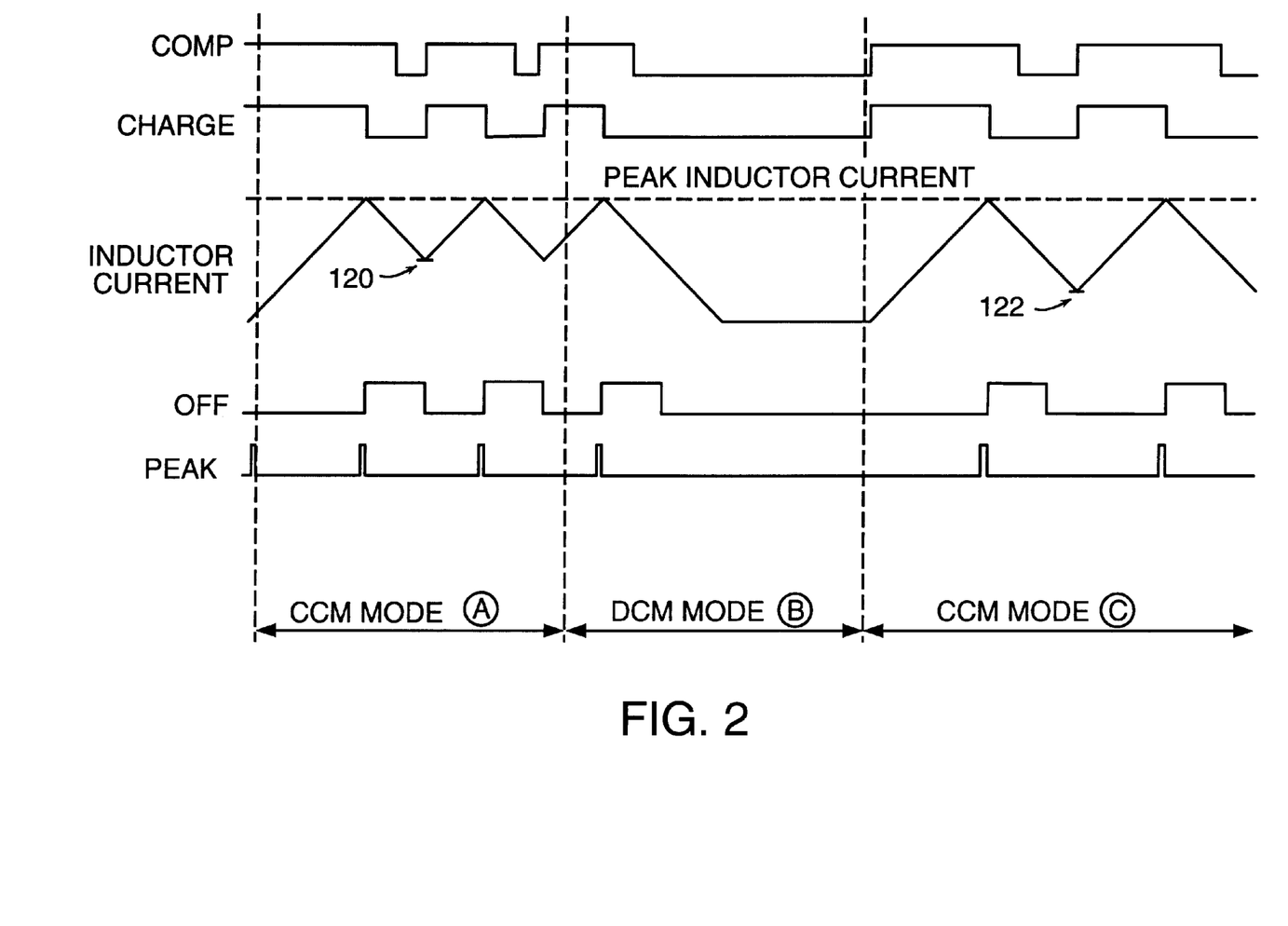
FIG. 2 is a timing diagram for various signals in the circuit of FIG. 1 for different modes of operation.

FIG. 2 illustrates various signals depicted in FIG. 1 for the CCM and DCM operating modes. Region A depicts a heavy load condition (i.e., a large load current exists), during which the circuit operates in CCM to maintain output voltage VOUT in regulation. Region B of FIG. 2 depicts the signals of the circuit of FIG. 1 under DCM operation (e.g., sleep mode). As depicted at the transition from region A to region B, the inductor current continues to increase as the load changes. Due to the reduced load 100 in DCM, output voltage VOUT remains greater than the first reference voltage VREF for extended periods. Region C of FIG. 2 again depicts the signals in CCM mode. As depicted, load 100 is less than the load 100 of region A, but larger than the load 100 of region B.

With reference to the circuit start-up depicted in region A, output voltage VOUT is less than reference voltage VREF. Consequently, comparison signal COMP is logic high. Also during start-up, off-time signal OFF is logic low and peak current detection signal PEAK is logic low. Consequently, latch module 30 generates charge signal CHARGE at logic high and driver 60 generates amplified charge signal ACHARGE at logic high. As a result, switch 66 is connected to ground. The current through inductor 102 increases with time until it reaches a maximum allowable value. The peak current detection signal PEAK then transitions from logic low to logic high. Consequently, off-time signal OFF transitions from logic low to logic high, and charge signal CHARGE and amplified charge signal ACHARGE transition from logic high to logic low. In response, switch 66 is disconnected from ground. The voltage at inductor terminal 103 is sufficient to forward bias diode 105, so that current flows to load capacitance 104 and load 100. The current though inductor 102 decreases for the duration that off-time signal OFF is logic high. This duration is determined in response to supply voltage VSUPPLY and output voltage VOUT. At the expiration of this duration, output voltage VOUT is less than reference voltage VREF and the inductor 102 is again charged until the maximum allowable current occurs.

The load 100 is substantially reduced at the start of region B. Due to the reduced load, output voltage VOUT is greater than reference voltage VREF for an extended period of time after the expiration of logic high of off-time signal OFF. A new charge cycle begins when output voltage VOUT decreases to equal the reference voltage VREF.

With reference to region C, the load 100 is less than the load 100 for region A but sufficient to require CCM opera-tion. As comparison signal COMP transitions from logic low to logic high, switch 66 is connected to ground and the current through inductor 102 increases until it equals the maximum allowable current. As a result, off-time signal OFF transitions from logic low to logic high and switch 66 is disconnected from ground. Inductor 102 discharges for longer than the duration of off-time signal OFF. Consequently, the minimum inductor current 122 is less than the minimum inductor current 120 for region A. In effect, the minimum inductor current is modulated in response to load 100, output voltage VOUT, and supply voltage VSUPPLY.

Figure 3:
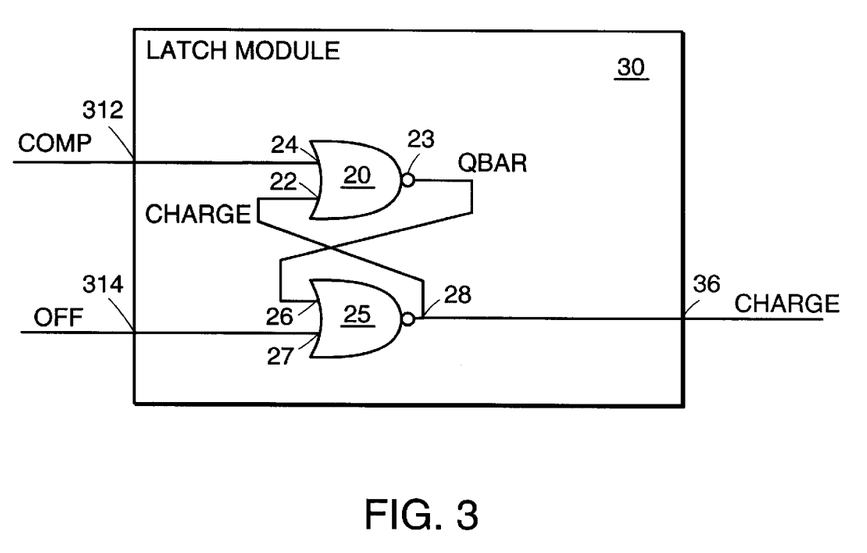
FIG. 3 is a block diagram showing in more detail an embodiment of the latch module of FIG. 1.

With reference to FIG. 3, one embodiment of latch module 30 of FIG. 1 includes a first NOR gate 20 and a second NOR gate 25. A first input terminal 21 of the first NOR gate 20 is the first input terminal 32 of the latch module 30. The first NOR gate 20 also includes a second input terminal 22 and an output terminal 23. The second NOR gate 25 includes a first input terminal 26 that is in communication with the output terminal 23 of the first NOR gate 20. The second NOR gate 25 also includes a second input terminal 27 that is the second input terminal 34 of the latch module 30, and an output terminal 28 that is the output terminal 36 of the latch module 30 and is in communication with the second input terminal 22 of the first NOR gate 20.

Table 2 depicts the logical states of comparison signal COMP, off-time signal OFF, charge signal CHARGE and latch signal QBAR generated by latch module 30 according to various operating conditions. If comparison signal COMP is at logic low, and charge signal CHARGE is at logic low, latch signal QBAR is at logic high. If off-time signal OFF is at a logic low, then charge signal CHARGE generated out the output terminal 28 of the second NOR gate 25 remains at logic low.

TABLE 2

| | Logic Level | | | |
|---|---|---|---|---|
| COMP | Low | High | High or Low | High or Low |
| CHARGE | Low | Low to High | High | High to Low |
| OFF | Low | Low | Low | High |
| QBAR | High | High to Low | Low | Complement of Comp |
| Result | Switch 66 not connected to ground | Switch 66 connected to ground | Switch 66 connected to ground | Switch 66 not connected to ground |

When output voltage VOUT decreases to the first reference voltage VREF, comparison signal COMP transitions to logic high. Thus the input signals at the first NOR gate 20, comparison signal COMP and charge signal CHARGE, are at logic high and logic low, respectively. In response, latch signal QBAR transitions to logic low. The input signals to the second NOR gate 25, latch signal QBAR and off-time signal OFF, are both logic low. In response, charge signal CHARGE transitions to logic high, therefore rending switch 66 conductive and applying supply voltage VSUPPLY across inductor 102. When charge signal CHARGE transitions to logic high, at least one of the input signals to the first NOR gate 20, charge signal CHARGE or comparison signal COMP, is at logic high. Consequently, latch signal QBAR remains at logic low, latch module 30 is "set", and supply voltage VSUPPLY remains applied across inductor 102.

When off-time signal OFF transitions to logic high, the input signals to the second NOR gate 25, latch signal QBAR and off-time signal OFF, are at logic low and logic high, respectively. In response, charge signal CHARGE transitions to logic low, thereby rendering switch 66 nonconductive. Consequently, supply voltage VSUPPLY is no longer applied across inductor 102. If output voltage VOUT is greater than the reference voltage VREF when latch signal QBAR transitions to logic low, comparison signal COMP is at logic low. Because comparison signal COMP and charge signal CHARGE are both at logic low, latch signal QBAR is at logic high. Thus charge signal CHARGE at output terminal 28 of the second NOR gate 25 is at logic low, as explained above.

Figure 4:
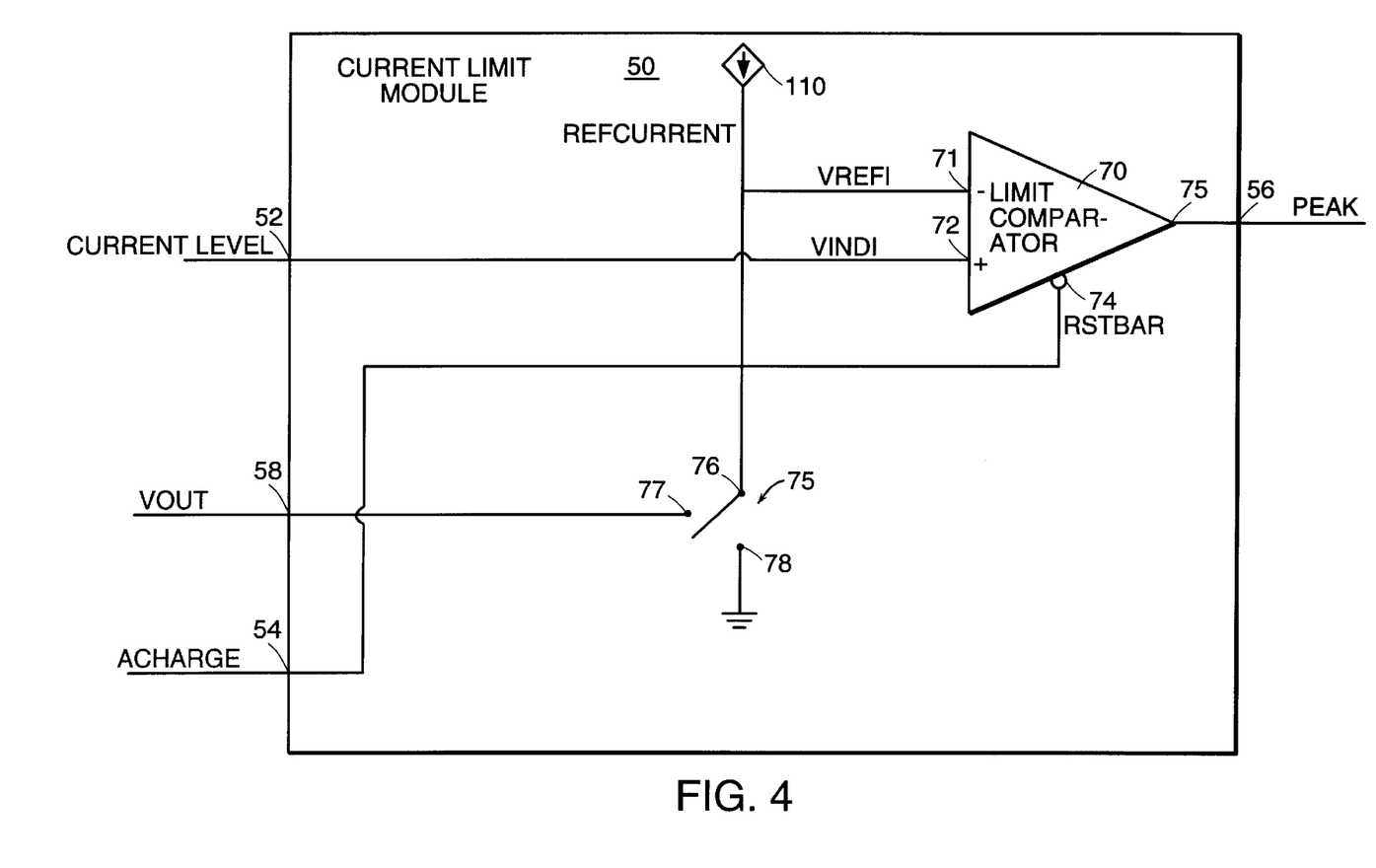
FIG. 4 is a schematic diagram showing in more detail an embodiment of the current limit module of FIG. 1.

With reference to FIG. 4, one embodiment of current limit module 50 of FIG. 1 includes a limit switch 75 and a limit comparator 70. The limit switch 75 includes a first terminal 76 configured to receive a reference current REFCURRENT from current source 110, a second terminal 78 coupled to ground, and a control terminal 77 in communication with the third input terminal 58. In one embodiment limit switch 75 is a MOSFET. Limit comparator 70 includes a first input terminal 72 in communication with the second input terminal 52 of current limit module 50 to receive a voltage VINDI, defined across switch 66, that is indicative of the current through inductor 102, a second input terminal 71 configured to receive a voltage VREFI defined across limit switch 75 indicative of the reference current REFCURRENT, a reset terminal 74 in communication with the first input terminal 54 of current limit module 50, and an output terminal 73 which is the output terminal 56 of current limit module 50.

In operation, when charge signal CHARGE is logic high, current through inductor 102 increases. Limit comparator 70 compares input voltages VINDI and VREFI, during the charging of inductor 102. When voltage VINDI is greater than voltage VREFI, peak current detection signal PEAK transitions to logic high indicating that the maximum current flow through inductor 102 has occurred. Consequently, off-time signal OFF transitions to logic high, charge signals CHARGE and ACHARGE transitions to logic low, and limit comparator 70 is reset (i.e., pulled low by amplified charge signal ACHARGE) to terminate further comparison. As a result, supply voltage VSUPPLY is no longer applied across inductor 102, and excess inductor current that can damage the inductor 102 is prevented.

Figure 5:
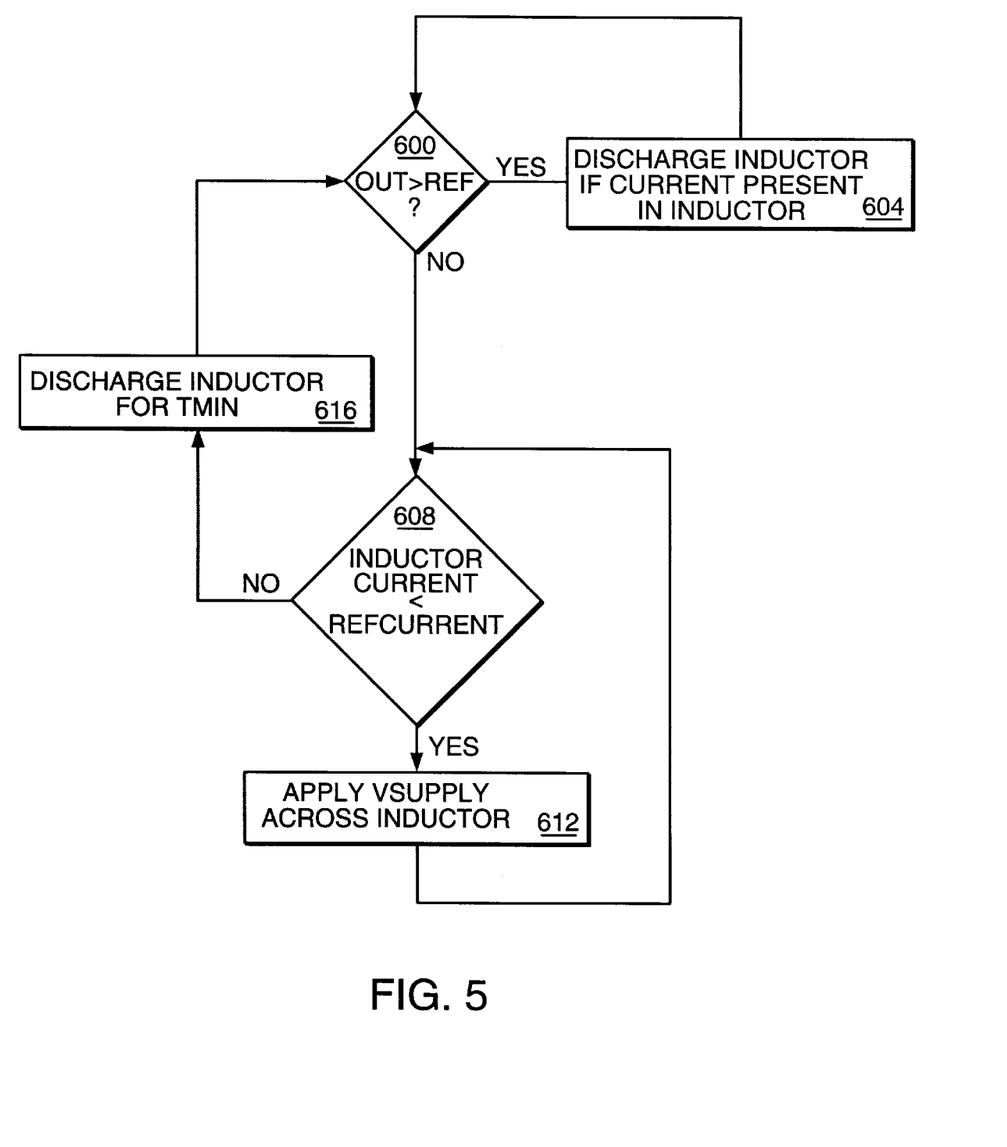
FIG. 5 is a flowchart representation of an embodiment of a method for providing a regulated output voltage in accordance with the present invention.

With reference to FIG. 5, one embodiment of the present invention relates to a method for providing a regulated output voltage. In step 600 output voltage VOUT is compared with reference voltage VREF. If output voltage VOUT is greater than reference voltage VREF, the method proceeds to step 604 and inductor 102 is discharged if current is present in inductor 102. If there is no current in inductor 102, the method continues to loop between steps 600 and 604 until output voltage VOUT is less than reference voltage VREF. If output voltage VOUT is less than reference voltage VREF, the method proceeds to step 608 to determine if the current flowing through inductor 102 is less than reference current REFCURRENT. If the current through inductor 102 is greater than or equal to reference current REFCURRENT, the method proceeds to step 616 and inductor 102 is discharged for a minimum time substantially proportional to the reciprocal of the difference between output voltage VOUT and supply voltage VSUPPLY. If the current through inductor 102 is less than reference current REFCURRENT, the method proceeds to step 612, and supply voltage VSUPPLY is applied across inductor 102. Consequently, the current flowing through inductor 102 increases. The method returns to step 608 and the current through inductor 102 is again compared with the reference current REFCURRENT.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A voltage regulation circuit comprising:
   a feedback comparator having a feedback comparator first input terminal configured to receive a regulated output voltage, a feedback comparator second input terminal configured to receive a first reference voltage and a feedback comparator output terminal, said feedback comparator generating a comparison signal at said feedback comparator output terminal in response to said regulated output voltage;
   a latch module comprising a latch first input terminal in communication with said feedback comparator output terminal, a latch second input terminal configured to receive an off-time signal having a variable asserted duration, and a latch output terminal, said latch module generating a charge signal at said latch output terminal in response to said comparison signal and said off-time signal;
   a switch having a control terminal in communication with said latch output terminal, a first terminal configured to receive a current level signal, and a second terminal configured to receive a second reference voltage;
   a current limit module comprising a current limit first input terminal in communication with said latch output terminal, a current limit second input terminal configured to receive said current-level signal, a current limit third input terminal configured to receive said regulated output voltage, and a current limit output terminal, said current limit module generating a peak detect signal at said current limit output terminal in response to said charge signal, said regulated output voltage, and said current-level signal; and
   a pulse module comprising a pulse first input terminal in communication with said current limit output terminal, a pulse second input terminal configured to receive a supply voltage, a pulse third input terminal configured to receive said regulated output voltage, and a pulse output terminal in communication with said latch second input terminal, said pulse module generating said off-time signal at said pulse output terminal in response to said peak detect signal, said input voltage and said regulated output voltage.

2. The circuit of claim 1 wherein said variable asserted duration of said off-time signal is substantially $$T_{off}=(K_{off}/(V_{out}-V_{supply})),$$

wherein $T_{off}$ is said variable asserted duration, $V_{supply}$ is said supply voltage, $K_{off}$ is a constant of proportionality and $V_{out}$ is said regulated output voltage.

3. The circuit of claim 1 further comprising a driver module having a driver input terminal in communication with said latch output terminal and a driver output terminal in communication with said switch control terminal and said current limit first input terminal.

4. The circuit of claim 1 wherein the current limit module comprises:
   a limit switch having a control terminal in communication with said current limit third input terminal, a first terminal configured to receive a reference current, and a second terminal configured to receive a third reference voltage; and a limit comparator having a limit comparator first input terminal in communication with said first terminal of said limit switch, a limit comparator second input terminal in communication with said second terminal of said current limit module, a reset terminal in communication with said first terminal of said current limit module, Sand a limit comparator output terminal in communication with said current limit output terminal.

5. The circuit of claim 4 wherein said second and third reference voltages are substantially ground.

6. The circuit of claim 4 wherein said second reference voltage is substantially equal to said third reference voltage.

7. A circuit for providing a regulated output voltage comprising:

a feedback comparator having a feedback comparator first input terminal configured to receive a regulated output voltage, a feedback comparator second input terminal configured to receive a reference voltage and a feedback comparator output terminal, said feedback comparator providing a comparison signal at said feedback comparator output terminal in response to said regulated output voltage;

a pulse generation module having a pulse output terminal, said pulse generation module providing an off-time signal having a first state at said pulse output terminal, said first state having a dynamically determined duration; and a logic module comprising a first logic terminal in communication with said feedback comparator output terminal, a second logic terminal in communication with said pulse output terminal, and a charge control terminal, said logic module providing a charge signal for a maximum time at said charge control terminal in response to said comparison signal and said off-time signal.

8. The circuit of claim 7 wherein said pulse generation module further comprises a first pulse generation input terminal configured to receive said regulated output voltage and a second pulse generation input terminal configured to receive a supply voltage, said pulse generation module providing said off-time signal in response to said regulated output voltage and said supply voltage.

9. The circuit of claim 8 wherein said dynamically determined duration is substantially $$T_{off}=(K_{off}/(V_{out}-V_{supply})),$$

wherein $T_{off}$ is said dynamically determined duration, $V_{supply}$ is said supply voltage, $K_{off}$ is a constant of proportionality and $V_{out}$ is said regulated output voltage.

10. The circuit of claim 9 wherein said output voltage $V_{out}$ is substantially constant.

11. The circuit of claim 9 wherein said supply voltage $V_{supply}$ is substantially constant.

12. A method for generating a regulated output voltage comprising:

comparing said regulated output voltage and a reference voltage;

comparing an inductor current and a reference current;

charging an inductor for a maximum time if said regulated output voltage is less than said reference voltage and if said inductor current is less than said reference current;

discharging said inductor for at least a minimum time if said inductor current increases to substantially equal said reference current.

13. The method of claim 12 wherein said minimum time is responsive to a supply voltage and said regulated output voltage.

14. The method of claim 13 wherein said minimum time is substantially $$T_{off}=(K_{off}/(V_{out}-V_{supply})),$$

wherein $T_{off}$ is said minimum time, $V_{supply}$ is said supply voltage, $K_{off}$ is a constant of proportionality and $V_{out}$ is said regulated output voltage.

15. The method of claim 14 wherein said output voltage $V_{out}$ is substantially constant.

16. The method of claim 14 wherein said supply voltage $V_{supply}$ is substantially constant.

17. A method for generating a regulated output voltage comprising:

generating an off-time signal having a first state and a second state, said first state having an asserted duration;

charging an inductor for a maximum time if said regulated output voltage is less than a reference voltage and said off-time signal is not in said first state; and interrupting said charging of said inductor for at least said asserted duration if said off-time signal transitions from said second state to said first state.

18. The method of claim 17 wherein said asserted duration is dynamically configured in response to said regulated output voltage and a supply voltage.

19. The method of claim 18 wherein said asserted duration is substantially $$T_{off}=(K_{off}/(V_{out}-V_{supply})),$$

wherein $T_{off}$ is said asserted duration, $V_{supply}$ is said supply voltage, $K_{off}$ is a constant of proportionality and $V_{out}$ is said regulated output voltage.

20. The method of claim 19 wherein said output voltage $V_{out}$ is substantially constant.

21. The method of claim 19 wherein said supply voltage $V_{supply}$ is substantially constant.

22. A circuit for generating a regulated output voltage comprising:

means for detecting a peak-current limit and generating a peak-current signal in response thereto;

means for generating an off-time signal having a variable asserted duration in response to said peak-current signal;

means for comparing said regulated output voltage and a reference voltage and generating a comparison signal in response thereto; and means for generating a charge signal having a maximum time in response to said comparison signal and said off-time signal.

23. A circuit for generating a regulated output voltage comprising:

means for generating an off-time signal having a first state with an asserted duration and a second state;

means for determining a regulated output voltage;

means for charging an inductor for a maximum time if said regulated output voltage is less than a reference voltage and said off-time signal is not in said first state; and means for interrupting said charging of said inductor for at least said asserted duration if said off-time signal transitions from said second state to said first state.

* * * * *

UNITED STATES PATENT AND TRADEMARK OFFICE
CERTIFICATE OF CORRECTION

PATENT NO.   : 6,486,645 B1
DATED        : November 26, 2002
INVENTOR(S)  : Van Auken It is certified that error appears in the above-identified patent and that said Letters Patent is hereby corrected as shown below:

Column 9,
Line 7, the word "Sand" should read -- and --.

Signed and Sealed this

Twenty-fifth Day of March, 2003

JAMES E. ROGAN
*Director of the United States Patent and Trademark Office*